US012688419B2

(12) United States Patent
Schmidt

(10) Patent No.: US 12,688,419 B2
(45) Date of Patent: Jul. 21, 2026

(54) FURTHER TRAINING OF NEURAL NETWORKS FOR THE EVALUATION OF MEASUREMENT DATA

(71) Applicant: Robert Bosch GmbH, Stuttgart (DE)

(72) Inventor: Frank Schmidt, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 552 days.

(21) Appl. No.: 18/357,326

(22) Filed: Jul. 24, 2023

(65) Prior Publication Data

US 2024/0037392 A1 Feb. 1, 2024

(30) Foreign Application Priority Data

Jul. 27, 2022 (DE) .................... 10 2022 207 726.1

(51) Int. Cl.
*G06N 3/08* (2023.01)

(52) U.S. Cl.
CPC ..................................... *G06N 3/08* (2013.01)

(58) Field of Classification Search
None
See application file for complete search history.

(56) References Cited

U.S. PATENT DOCUMENTS

| | | | | |
|---|---|---|---|---|
| 9,454,733 | B1 * | 9/2016 | Purpura | ................. G06N 20/00 |
| 2019/0188568 | A1 * | 6/2019 | Keskar | ..................... G06N 3/08 |
| 2024/0143970 | A1 * | 5/2024 | Zaki | ........................ G06F 30/13 |

FOREIGN PATENT DOCUMENTS

| | | | | |
|---|---|---|---|---|
| DE | 102019215120 | A1 | 6/2020 | |
| EP | 4060408 | A1 * | 9/2022 | ............. G06N 3/045 |
| WO | WO-2022144205 | A1 * | 7/2022 | ............. G06N 3/088 |

OTHER PUBLICATIONS

Sheikh et al., "Gradient and Log-Based Active Learning for Semantic Segmentation of Crop and Weed for Agricultural Robots," 2020 IEEE International Conference on Robotics and Automation (ICRA), 2020, pp. 1350-1356.
"Using the CNN Architecture in Image Processing," ODSC—Open Data Science, 2020, pp. 1-10.

* cited by examiner

*Primary Examiner* — James M Hannett
(74) *Attorney, Agent, or Firm* — NORTON ROSE FULBRIGHT US LLP

(57) ABSTRACT

A method for further training of a neural network for processing measurement data, which neural network has been pre-trained with training examples from a set M. In the method: a batch B of new training examples is provided; a subset D⊆M of the previous training examples is provided; the new training examples from batch B and the previous training examples from subset D are processed by the neural network into outputs respectively; the deviations of the outputs from the respective target outputs are evaluated using a predefined cost function; parameters characterizing the behavior of the neural network are optimized with the aim that, during further processing of previous and new training examples, the evaluation with the cost function is improved in regard to new training examples from batch B and is not made worse in regard to previous training examples from subset D.

16 Claims, 2 Drawing Sheets

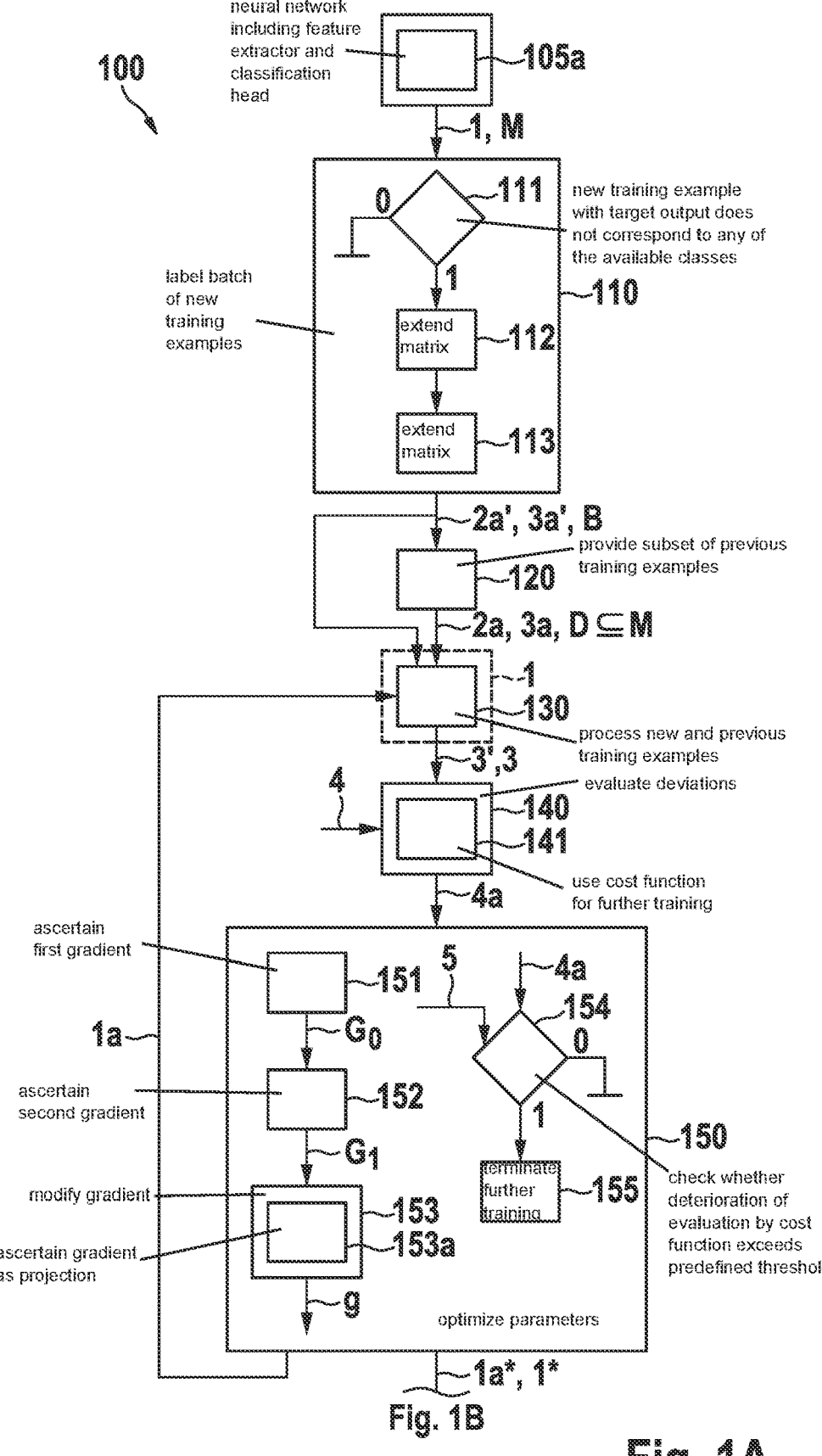

neural network including feature extractor and classification head — 105a

100

0 — 111 — new training example with target output does not correspond to any of the available classes — 110

1, M label batch of new training examples

1 extend matrix — 112 extend matrix — 113

2a', 3a', B — provide subset of previous training examples — 120

2a, 3a, D ⊆ M

1 — 130 — process new and previous training examples

3', 3

4 — evaluate deviations — 140 — 141 — use cost function for further training

4a ascertain first gradient — 151

5

4a — 154 — 0

$G_0$

1a ascertain second gradient — 152

$G_1$

1 — 150 — check whether deterioration of evaluation by cost function exceeds predefined threshold terminate further training — 155 modify gradient — 153 — 153a ascertain gradient as projection g optimize parameters 1a*, 1*

Fig. 1A
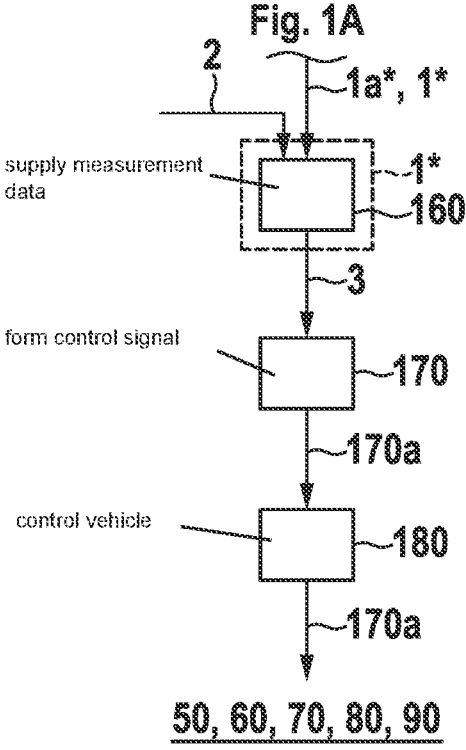
supply measurement data
form control signal
control vehicle
2
1a*, 1*
1*
160
3
170
170a
180
170a
50, 60, 70, 80, 90
Fig. 1B
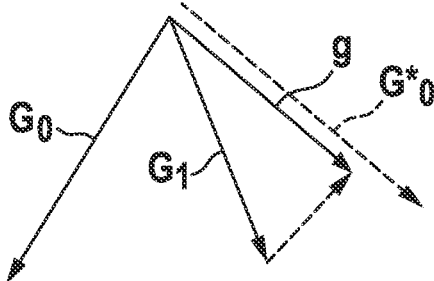
$G_0$
$G_1$
$g$
$G^*_0$
Fig. 2

FURTHER TRAINING OF NEURAL NETWORKS FOR THE EVALUATION OF MEASUREMENT DATA

CROSS REFERENCE

The present application claims the benefit under 35 U.S.C. § 119 of German Patent Application No. DE 10 2022 207 726.1 filed on Jul. 27, 2022, which is expressly incorporated herein by reference in its entirety.

FIELD

The present invention relates to the further training of pre-trained neural networks which may be used, for example, for classifying images or other measurement data for the presence of certain types of objects.

BACKGROUND INFORMATION

Neural networks which classify images or other measurement data for the presence of certain objects, for example, are typically trained in a supervised manner on a large number of training examples, which are labeled with target outputs. On completion of the training, the neural network is expected to deliver the correct output for the specific task set, even for images or measurement data not seen during training.

In this connection, there may subsequently be a need to extend this training. For example, following the introduction of a new traffic sign by the legislature, a system for recognizing traffic signs will have to be updated in order to be able to reliably recognize this new traffic sign.

SUMMARY

A method has been developed within the scope of the present invention for the further training of a neural network for processing measurement data. The method is based on the situation where the neural network has been trained with training examples from a set M, each training example being labeled with a target output of the neural network.

According to an example embodiment of the present invention, as part of the method, a batch B of new training examples, which are likewise labeled with target outputs of the neural network, is provided. In addition, a subset $D \subseteq M$ of the previous training examples is provided.

In this context, training examples generated with a generative model, such as a Generative Adversarial Network (GAN), are considered to be equivalent to the training examples actually used in the previous training. It is thus possible to store the generative model with which such training examples may be produced, rather than these previous training examples. The generated training examples are in the same domain as the previously used training examples, and this is important for their effect in the method proposed here.

Both the new training examples from batch B and the previous training examples from subset D are processed by the neural network into outputs. The deviations of these outputs from the respective target outputs are evaluated using a predefined cost function.

Parameters characterizing the behavior of the neural network are optimized with the aim that, during further processing of previous and new training examples, the evaluation with the cost function is improved in regard to new training examples from batch B and is not made worse in regard to previous training examples from subset D.

The parameters may in particular include weights, for example, with which inputs that are supplied to a neuron or to another processing unit of the neural network may be weighted and summed.

Further training in this way expands the domain on which the neural network is trained from the original set M of training examples by the new batch B, without the need for the huge computing effort that would be required for a completely new training on the union set $M \cup B$ of training examples.

Moreover, according to an example embodiment of the present invention, access to the complete set M of the original training data is not required, only to a relatively small subset D, which should ideally be a representative cross-section of the set M. This small subset D may also be stored in the limited memory space of a control unit or embedded system on board a vehicle, for example. By contrast, the onboard storage of the training images for an object recognition system recorded over several thousand hours of road tests, for example, would not be practicable. Even if the necessary memory space could somehow be provided, the system manufacturer who carried out the original training would not relinquish control of the complete set M of training examples. Labeled training examples are very expensive to acquire, so a competitor getting hold of the complete set M of training examples would be able to save a substantial proportion of the costs of developing its own system.

If, on the other hand, the further training is carried out as a "service", for example, in a cloud perhaps, then there is no limitation with regard to memory space. In addition, the training examples then do not have to be handed over. In this case, there is therefore no reason not to select the complete set M of training examples as the subset D.

The check to determine whether the evaluation by the cost function in regard to the previous training examples from subset D is made worse by the further training protects the neural network against what is known as "catastrophic forgetting". The newly acquired knowledge from batch B is thus added to the previous knowledge from set M, rather than replacing it. This is particularly important for applications in vehicles, for example, in which the correct behavior of the neural network in certain situations must be certified in order to be approved for use on public roads. The operating authorization for changes, like other changes to approved vehicles, may then be subject to the behavior potentially being improved by the change, and certainly not made worse.

In a particularly advantageous embodiment of the present invention, a first gradient $G_0$ of the expected value of the cost function for the previous training examples from subset D is ascertained according to the parameters, for example using the formula $$G_0 = \nabla_P E_{(x,y) \sim D}[L(f(x),y)].$$

In this formula, P are the parameters to be optimized, E is the expected value, x is a training example, y is the target output for this training example x, L is the cost function, and f(x) is the output of the neural network for the training example x.

In addition, a second gradient $G_1$ of the expected value of the cost function for the new training examples from batch B is also ascertained according to the parameters, for example using the formula $$G_1 = \nabla_p E_{(x,y) \sim B}[L(f(x),y)].$$

From these two gradients $G_0$ and $G_1$, a gradient g is ascertained along which the parameters are modified in the next training step. This allows for close monitoring of the effect this intended change in the next training step has on the acquisition of new knowledge on the one hand and on a possible "catastrophic forgetting" of previous knowledge on the other.

The gradient g may particularly advantageously be ascertained as a projection of $G_1$ onto an orthogonal complement $G_0{}^*$ of $G_0$, for example in accordance with the formula $$g = G_1 - \frac{\langle G_0, G_1 \rangle}{\|G_0\|^2} \cdot G_0.$$

The gradient g then has no component along $G_0$. (FIG. 1A, 153a) There is therefore no deterioration in regard to the previous training examples from subset D. In order for this boundary condition to be met, training progress in regard to the new training examples from batch B is also deferred, if necessary.

The gradients may be calculated simultaneously for all parameters or successively for the parameters in the various layers in which the neural network is organized, for example.

In a further particularly advantageous embodiment of the present invention, in response to a situation where a deterioration of the evaluation by the cost function in regard to previous training examples from subset D exceeds a predefined threshold, the further training is terminated. The deterioration may be measured in the form of the expected value $$E_{(x,y) \sim D}[L(f(x),y)]$$

of the cost function in regard to the previous training examples from subset D, for example. In addition, this measurement cannot be "fooled" by the fact that only small deteriorations occur in each training step. The accumulation of such small deteriorations is reliably recorded.

This means that the potential for the further training of neural network 1 may be "depleted" or "exhausted", similarly to the way in which, in bridge building, a beam extending from a pier is only able to be suspended freely in the air for a certain distance before sagging. If a certain number of new training examples are available, then in terms of this "depletion/exhaustion" it is better to present all these new training examples in a single batch B rather than dividing them into multiple batches B.

According to an example embodiment of the present invention, to supervise the further training, it may be particularly advantageous to use the same cost function that was used for the original training of the neural network on the training examples from set M. This provides the most accurate measure of the extent to which the behavior of the further-trained network in regard to the previous training examples from subset D still corresponds to the originally trained behavior. If this cost function is not available, however, any other suitable cost function may also be used.

In a further particularly advantageous embodiment of the present invention, a neural network is chosen that is designed as a classifier for measurement data, particularly for images, into classes of a predefined classification. Especially in such applications, after training on a large number of classes, the need to add recognition of a few more classes still often arises at a later date. In addition, there are few competing interactions between the tasks of recognizing features relating to different classes. This means that the improvement in recognition in regard to one class does not come at the cost of recognition in regard to other classes.

According to an example embodiment of the present invention, the neural network may then in particular comprise, for example a feature extractor, which converts an input of the neural network into a feature map, which may be represented as a vector with K elements, and a classification head which, by applying a k×K matrix A, and optionally a k-dimensional bias vector b, maps the feature map onto a vector having k classification scores relating to k available classes as the output of the neural network.

A network with this architecture may be extended with additional classes in a particularly effective and organic manner.

In particular, in response to a situation where, for example, at least one new training example in batch B is labeled with a target output that does not correspond to any of the k available classes, the matrix A may be extended with an additional k+1th row, which is filled with the mean of the existing k rows, and if present, the bias vector b may be extended with a k+1th component, which is filled with the mean of the existing k components.

The softmax score for this new class is then $$\frac{\exp\left(\frac{1}{k}\sum_{i=1}^{k} x_k\right)}{\exp\left(\frac{1}{k}\sum_{i=1}^{k} x_k\right) + \sum_{i=1}^{k} \exp(x_k)} = \left[1 + \frac{\sum_{i=1}^{k} \exp(x_k)}{\exp\left(\frac{1}{k}\sum_{i=1}^{k} x_k\right)}\right]^{-1} \le \frac{1}{k+1}$$

because of Jensen's inequality. This means that, with no further training, the classification score for the new class is only at most that which would be expected if a class were to be randomly drawn from all k+1 available classes. Recognition of the k+1th class may thus be added without modifying the behavior of the classifier with respect to the k existing classes. No new information is introduced into the system that does not actually exist.

In a further particularly advantageous embodiment of the present invention, the subset D⊆M is chosen such that it contains substantially equal numbers of previous training examples for the classes of the predefined classification. It is then a representative cross-section of the original set M of training examples. This means that the behavior of the neural network on subset D is very probably a suitable prediction of the behavior on the original set M of training examples.

The classes may in particular represent, for example, road users, roadways, road boundaries, traffic signs, obstacles and/or other objects of relevance when driving a vehicle. Particularly in the case of traffic signs and road users, there are often innovations which may be the subject of further training. Thus, for example, an entirely new vehicle category was created a few years ago with the introduction of small electric vehicles ("e-scooters").

The new values of the parameters characterizing the behavior of the neural network that are acquired during further training may be collected at a central entity, for example, and used as the basis for a general update of the neural network to be published at a later date. In particular, values of the parameters of a multiplicity of users may be collected, for example. The privacy of the users is retained here, since the parameters allow no conclusions to be drawn about the new training examples in batch B.

In particular, images, audio signals, time series of measurements, radar data and/or lidar data, for example, may be chosen as measurement data. These types of data are very multilayered, in the sense that they may include statements about many possible classes.

Another important application of further training is visual quality control, of mass-produced components for example. In this case, further training may be used to adjust the process to new components and/or new conditions, for example.

In a further particularly advantageous embodiment of the present invention, measurement data are supplied to the further-trained neural network in order for the further-trained neural network to generate outputs. A control signal is formed from these outputs. This control signal is used to control a vehicle, a driver assistance system, a system for quality control, a system for monitoring areas, and/or a system for medical imaging. Owing to the better ability of the neural network to operate in the domain of training examples expanded by batch B and to generalize on the basis thereof, the probability that the response of the controlled system will be commensurate with the situation detected with the measurement data is then increased.

The method may in particular be wholly or partially computer-implemented. The present invention thus also relates to a computer program having machine-readable instructions which, when executed on one or more computers and/or compute instances, cause the computers and/or compute instances to carry out the method described. In this context, control units for vehicles and embedded systems for technical devices which are likewise capable of executing machine-readable instructions may also be regarded as computers. Examples of compute instances are virtual machines, containers or serverless runtime environments for executing machine-readable instructions in a cloud.

The present invention also relates to a machine-readable data carrier and/or to a download product having the computer program. A download product is a digital product which is transmissible over a data network, i.e., is downloadable by a user of the data network and which may be offered in an online shop for immediate download, for example.

Further measures that improve the present invention along with the description of the preferred exemplary embodiments of the present invention are presented in detail below by way of the figures.

BRIEF DESCRIPTION OF THE DRAWINGS

FIGS. 1A and 1B show an exemplary embodiment of the method 100 for the further training of a neural network 1, according to the present invention.

FIG. 2 illustrates the formation of a gradient g along which parameters 1a may be modified without any deterioration in regard to previous training examples 2a, according to an example embodiment of the present invention.

6

DETAILED DESCRIPTION OF EXAMPLE EMBODIMENTS

FIGS. 1A and 1B show a schematic flow diagram of an exemplary embodiment of the method 1 for the further training of a neural network 1 for processing measurement data 2. This neural network 1 has been pre-trained with training examples 2a from a set M, each training example 2a being labeled with a target output 3a of neural network 1.

In step 105, a neural network 1 is chosen that is designed as a classifier for measurement data (2), particularly for images, into classes of a predefined classification.

According to block 105a, such a network 1 may comprise in particular a feature extractor, which converts an input 2 of neural network 1 into a feature map, which may be represented as a vector with K elements, and a classification head which, by applying a k×K matrix A, and optionally a k-dimensional bias vector b, maps the feature map onto a vector having k classification scores relating to k available classes as output 3.

In step 110, a batch B of new training examples 2a', which are likewise labeled with target outputs 3a' of neural network 1, is provided.

According to block 111, in response to a situation where at least one new training example 2a' in batch B is labeled with a target output 3a' that does not correspond to any of the k available classes (truth value 1), matrix A may be extended according to block 112 with an additional k+1th row, which is filled with the mean of the existing k rows, and according to block 113, bias vector b, if present, may be extended with a k+1th component, which is filled with the mean of the existing k components.

In step 120, a subset D⊆M of previous training examples 2a is provided.

In step 130, both the new training examples 2a' from batch B and the previous training examples 2a from subset D are processed by neural network 1 into outputs 3', 3 respectively.

In step 140, the deviations of outputs 3', 3 from the respective target outputs 3a', 3a are evaluated using a predefined cost function 4. The result is an evaluation 4a.

In particular here, according to block 141, cost function 4 that was used for the original training of neural network 1 on training examples 2a from set M may also be used for the further training, for example.

In step 150, parameters 1a characterizing the behavior of neural network 1 are optimized with the aim that, during further processing of previous and new training examples 2a, 2a', evaluation 4a with cost function 4 is improved in regard to new training examples 2a' from batch B and is not made worse in regard to previous training examples 2a from subset D.

The final optimized state of parameters 1a is denoted by reference sign 1a*. Correspondingly, the further-trained state of neural network 1 is denoted by reference sign 1*.

According to block 151, a first gradient $G_0$ of the expected value of cost function 4 for the previous training examples 2a from subset D may be ascertained according to parameters 1a.

According to block 152, a second gradient $G_1$ of the expected value of cost function 4 for the new training examples 2a' from batch B may then be ascertained according to parameters 1a.

According to block 153, from gradients $G_0$ and $G_1$, a gradient g may be ascertained along which parameters 1$a$ are modified in the next training step.

According to block 154, it is possible to check whether a deterioration of evaluation 4$a$ by cost function 4 in regard to previous training examples 2$a$ from subset D exceeds a predefined threshold 5. If that is the case (truth value 1), then according to block 155 the further training may be terminated.

In step 160, measurement data 2 are supplied to further-trained neural network 1* in order for further-trained neural network 1* to generate outputs 3.

In step 170, a control signal 170$a$ is formed from outputs 3 of neural network 1.

In step 180, control signal 170$a$ is used to control a vehicle a driver assistance system 60, a system 70 for quality control, a system 80 for monitoring areas, and/or a system 90 for medical imaging.

FIG. 2 illustrates in a simplified two-dimensional view how a gradient g along which parameters 1$a$ may be modified without any deterioration in regard to previous training examples 2$a$ may be obtained.

The gradient $G_0$ of the expected value of cost function 4 for previous training examples 2$a$ from subset D according to parameters 1$a$ indicates the direction in which parameters 1$a$ must be modified in order to change evaluation 4$a$ by cost function 4 in regard to previous training examples 2$a$ from subset D. Since such a change is undesirable, the orthogonal complement $G_0^*$ to $G_0$ is formed. Parameters 1$a$ may be modified along this orthogonal complement $G_0^*$ without bringing about said undesirable change. The desired gradient g thus runs along $G_0^*$.

The value of g is derived from a second gradient $G_1$ of the expected value of cost function 4 for new training examples 2$a'$ from batch B according to parameters 1$a$. To this end, gradient $G_1$ is projected onto $G_0^*$.

What is claimed is:

1. A method for further training of a neural network for processing measurement data, the neural network having been pre-trained with training examples from a set M, each of the training examples being labeled with a target output of the neural network, the method comprising the following steps:

providing a batch B of new training examples, which are labeled with target outputs of the neural network;

providing a subset D⊆M of the previous training examples;

processing, by the neural network both the new training examples from the batch B and the previous training examples from the subset D, into outputs respectively;

evaluating deviations of the outputs from the respective target outputs using a predefined cost function; and optimizing parameters characterizing the behavior of the neural network with a goal that, during further processing of previous and new training examples, the evaluation with the cost function: i) is improved in regard to new training examples from the batch B, and ii) is not made worse in regard to previous training examples from the subset D.

2. The method as recited in claim 1, wherein:

a first gradient $G_0$ of an expected value of the cost function for the previous training examples from the subset D is ascertained according to the parameters, a second gradient $G_1$ of an expected value of the cost function for the new training examples from the batch B is ascertained according to the parameters, and from the gradients $G_0$ and $G_1$, a gradient g is ascertained along which the parameters are modified.

3. The method as recited in claim 2, wherein the gradient g is ascertained as a projection of the first gradient $G_1$ onto an orthogonal complement $G_0^*$ of the first gradient $G_0$.

4. The method as recited in claim 1, wherein, in response to a situation where a deterioration of the evaluation by the cost function in regard to previous training examples from the subset D exceeds a predefined threshold, the further training is terminated.

5. The method as recited in claim 1, wherein the cost function that was used for an original training of the neural network on the training examples from the set M is also used for the further training.

6. The method as recited in claim 1, wherein the neural network is a classifier configured to classify measurement data including images, into classes of a predefined classification.

7. The method as recited in claim 6, wherein the neural network includes:

a feature extractor, which converts an input of the neural network into a feature map, which may be represented as a vector with K elements, and a classification head which, by applying a k×K matrix A, and a k-dimensional bias vector b, maps the feature map onto a vector having k classification scores relating to k available classes as output.

8. The method as recited in claim 6, wherein the neural network includes:

a feature extractor, which converts an input of the neural network into a feature map, which may be represented as a vector with K elements, and a classification head which, by applying a k×K matrix A, maps the feature map onto a vector having k classification scores relating to k available classes as output.

9. The method as recited in claim 7, wherein, in response to a situation where at least one new training example in the batch B is labeled with a target output that does not correspond to any of the k available classes, wherein:

matrix A is extended with an additional k+1th row, which is filled with a mean of existing k rows, and the bias vector b is extended with a k+1th component, which is filled with the mean of existing k components.

10. The method as recited in claim 8, wherein, in response to a situation where at least one new training example in the batch B is labeled with a target output that does not correspond to any of the k available classes, wherein:

matrix A is extended with an additional k+1th row, which is filled with a mean of existing k rows.

11. The method as recited in claim 6, wherein the subset D⊆M is chosen such that it contains substantially equal numbers of previous training examples for the classes of the predefined classification.

12. The method as recited in claim 6, wherein the classes represent road users, and/or roadways, and/or road boundaries, and/or traffic signs, and/or obstacles, and/or other objects of relevance when driving a vehicle.

13. The method as recited in claim 1, wherein the measurement data include images, and/or audio signals, and/or time series of measurements, and/or radar data and/or lidar data.

14. The method as recited in claim 1, further comprising:

supplying measurement data to the further-trained neural network in order for the further-trained neural network to generate outputs;

forming a control signal from the outputs of the neural network; and using the control signal control: a vehicle, and/or a driver assistance system, and/or a system for quality control, and/or a system for monitoring areas, and/or a system for medical imaging.

15. A non-transitory machine-readable data carrier on which is stored a computer program including machine-readable instructions for further training of a neural network for processing measurement data, the neural network having been pre-trained with training examples from a set M, each of the training examples being labeled with a target output of the neural network, the machine-readable instructions, when executed on one or more computers and/or compute instances, cause the computers and/or compute instances to perform the following steps:

providing a batch B of new training examples, which are labeled with target outputs of the neural network;

providing a subset D⊆M of the previous training examples;

processing, by the neural network both the new training examples from the batch B and the previous training examples from the subset D, into outputs respectively;

evaluating deviations of the outputs from the respective target outputs using a predefined cost function; and optimizing parameters characterizing the behavior of the neural network with a goal that, during further processing of previous and new training examples, the evaluation with the cost function: i) is improved in regard to new training examples from the batch B, and ii) is not made worse in regard to previous training examples from the subset D.

16. One or more computers and/or compute instances configured to further train a neural network for processing measurement data, the neural network having been pre-trained with training examples from a set M, each of the training examples being labeled with a target output of the neural network, the one or more computers and/or compute instances configured to:

provide a batch B of new training examples, which are labeled with target outputs of the neural network;

provide a subset D⊆M of the previous training examples;

process, by the neural network both the new training examples from the batch B and the previous training examples from the subset D, into outputs respectively;

evaluate deviations of the outputs from the respective target outputs using a predefined cost function; and optimize parameters characterizing the behavior of the neural network with a goal that, during further processing of previous and new training examples, the evaluation with the cost function: i) is improved in regard to new training examples from the batch B, and ii) is not made worse in regard to previous training examples from the subset D.

\* \* \* \* \*